Patented Dec. 8, 1936

2,063,151

UNITED STATES PATENT OFFICE 2,063,151

PROCESS OF PRODUCING N-ARALKYL-AMINO-PHENOLS

Miles A. Dahlen and Richard G. Clarkson, Wilmington, Del., and Martin E. P. Friedrich, Carneys Point, N. J., assignors to E. I. du Pont de Nemours & Company, Wilmington, Del., a corporation of Delaware No Drawing. Application February 6, 1934, Serial No. 710,032

10 Claims. (Cl. 260—128)

This invention relates to aromatic compounds containing as a substituent a radical

in which the nitrogen atom is linked to a phenolic nucleus, more particularly N-aralkyl-aminophenols, and a process for the production thereof.

This application is a continuation-in-part of our co-pending application Serial No. 671,280 filed May 15, 1933 (now abandoned).

It is known that N-aralkyl-aminophenols may be prepared by the action of aralkyl-halides upon primary amino-phenols. For example, N-benzyl-para-aminophenol may be prepared by the action of benzyl-chloride on para-aminophenol. This method of preparing the N-aralkyl-aminophenols offers the widely recognized difficulty of producing as by-products often of very little value the N-diaralkyl-aminophenols. Thus, in the production of N-benzyl-para-aminophenol by this method large quantities of N-dibenzyl-para-aminophenol are obtained. Furthermore, the separation of the desired N-monoaralkyl-aminophenols from the N-diaralkyl derivatives and from the unreacted aminophenol is usually attended with many difficulties. As a result, this process is not a suitable method for the economical preparation of the N-aralkyl-aminophenols, particularly when products of high purity are desired.

It has also been proposed to produce the N-aralkyl-aminophenols from the corresponding N-aralkylidene-aminophenols by heating them in the presence of an alkaline reducing medium such as, for example, a metal and an alkali metal hydroxide. Similarly, the production of the N-aralkyl-aminophenols from the N-aralkylidene-aminophenols by the action of metallic sodium and alcohol has been proposed. Electrochemical methods of converting the N-aralkylidene-aminophenol to the corresponding N-aralkyl-aminophenol have also been suggested. These methods present many difficulties on account of the instability of the N-aralkyl-aminophenols under the acidic or alkaline conditions usually present. One of the disadvantages is the partial hydrolysis during the reaction of a portion of the N-aralkylidene-aminophenol to the parent aldehyde and aminophenol. As a result, the yields of the desired N-aralkyl-aminophenols are often low and the product may be contaminated with impurities such as an aminophenol.

It is an object of this invention to provide a new and improved process for the production of compounds having a radical

in which the nitrogen atom is attached to a phenolic nucleus. Another object is the provision of a new and improved process for the production of N-aralkyl-aminophenols. A further object is the provision of an improved process in which products of the character above described may be obtained in excellent yields and in a high state of purity. A still further object is the production of products of the character described by a process which may be readily and economically operated on a large scale. An additional object is the provision of a process which may be operated practically with raw materials containing impurities. Other objects will appear hereinafter.

These objects are accomplished according to this invention whereby compounds containing the radical

in which the nitrogen atom is attached to a phenolic nucleus, are produced by subjecting compounds containing the radical

in which the nitrogen atom is attached to a phenolic nucleus, to a catalytic hydrogenation in the liquid phase in the presence of a non-polar, non-hydrogenated organic solvent such as, for example, benzene and/or toluene.

The invention further contemplates in its more specific aspects the application of a process of the character above described under such conditions of temperature and pressure that it may be carried out commercially with starting materials containing impurities.

While the invention is susceptible to considerable variation and modification in the manner of its practical application, particularly as regards the proportions of materials, temperatures, pressures and the exact method of procedure, the following examples, in which the parts are by weight, will serve to illustrate how the process may be practised.

Example I

An autoclave was charged with 394 parts of dry toluene, 197 parts of dry N-benzal-para-aminophenol and 4 parts of an active nickel-on-kieselguhr catalyst. The air was displaced by hydrogen, the mass heated to 100° C. with agitation, and a pressure of 400 pounds per square inch of hydrogen applied. Rapid absorption of hydrogen took place, and additional quantities of the gas were added to maintain the above pressure. The temperature was held at 90° C. to 100° C. during the entire hydrogenation.

When reduction was complete, as shown by no further absorption of hydrogen, the mass was filtered at 100° C. through a pre-heated filter to remove the catalyst. The filtrate was diluted with an additional 100 parts of toluene and cooled with agitation to about 15° C. The N-benzyl-para-aminophenol crystallized as a white solid. It was separated by filtration and washed lightly with cold toluene to displace the mother liquors. The product was dried, preferably at temperatures below 70° C. The filtrates were concentrated and again cooled, another quantity of the product thus being obtained.

About 175 parts of N-benzyl-para-aminophenol, white in color and practically pure, were obtained from the first crystallization. An additional 15 to 20 parts of material of slightly inferior quality were obtained by the second crystallization. The total yield of product was about 95% of the theory, based on N-benzal-para-aminophenol used.

Example II

The process of Example I was repeated, substituting 300 parts of benzene for the 394 parts of toluene as the hydrogenating medium. After removal of catalyst by filtration, the benzene was distilled off leaving the crude N-benzyl-para-aminophenol as a semi-solid residue. The crude product was purified by crystallization from alcohol. A yield of approximately 95% of the theory, based on benzal compound reduced, was obtained.

According to procedures similar to those described in the examples, a large number of other products may be prepared, all of which are characterized by having a radical

in which the nitrogen atom is attached to a carbon atom of a phenolic nucleus. The following formula is illustrative of the type of compounds produced:

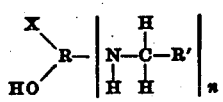

these compounds being obtained from compounds having the following general formula:

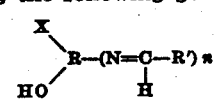

in which R represents an aromatic nucleus preferably of the benzene series, $n$ represents an integer, X represents hydrogen or a substituent group which is preferably non-reducible under the conditions of hydrogenation, examples of such non-reducible substituents being alkyl (e. g., methyl, ethyl, isopropyl, etc.), alkoxy (e. g., methoxy, ethoxy, etc.), aryloxy (e. g., phenoxy, naphthoxy, etc.), aryl (e. g., phenyl, naphthyl, etc.), hydroxy and halogens (e. g., chlorine, bromine, etc.), and R' represents hydrogen, alkyl, aralkyl (benzyl and the like), aryl, hydroaryl (cyclopentyl, cyclohexyl, hydronaphthyl, etc.), and heterocyclic (furfuryl, morpholyl, hydrothiazyl, quinolyl and the like) radicals. Where R' is a carbon radical, it may contain substituents other than hydrogen. Thus, where R' is an aryl nucleus, it may contain substituents such as, for example, alkyl, alkoxy and halogen groups.

Specific examples of these products and raw materials from which they may be prepared, in addition to the products given in the examples, are:

| Product | Prepared from |
|---|---|
| N-benzyl-ortho-aminophenol | N-benzal-ortho-aminophenol. |
| N-para'-methyl-benzyl-ortho-aminophenol. | N-para'-tolual-ortho-aminophenol. |
| N-(2'-chloro-benzyl)-para-aminophenol. | N-(2'-chloro-benzal)-para-aminophenol. |
| N-benzyl-meta-amino-para-cresol. | N-benzal-meta-amino-para-cresol. |
| N-benzyl-para-amino-guiacol. | N-benzal-para-amino-guiacol. |
| N-para'-methoxy-benzyl-para-chloro-ortho-aminophenol. | N-para'-anisal-para-chloro-ortho-aminophenol. |
| N-heptyl-para-aminophenol. | N-heptylidene-para-aminophenol. |
| N-heptyl-ortho-aminophenol. | N-heptylidene-ortho-aminophenol. |
| N-ethyl-para-aminophenol. | N-ethylidene-ortho-aminophenol. |
| N-hexahydrobenzyl-para-aminophenol. | N-hexahydrobenzal-para-aminophenol. |
| N-furfuryl-para-aminophenol. | N-furfural-para-aminophenol. |
| N-(4'-methyl-benzyl)-para-aminophenol. | N-(4'-methyl-benzal)-para-aminophenol. |
| N-(4'-methoxy-benzyl)-3-amino-6-hydroxy-toluene. | N-(4'-methoxy-benzal)-3-amino-6-hydroxy-toluene. |
| N-(2'-chloro-benzyl)-ortho-aminophenol. | N-(2'-chloro-benzal)-ortho-aminophenol. |
| N-(3'-hydroxy-benzyl)-meta-aminophenol. | N-(3'-hydroxy-benzal)-meta-aminophenol. |
| N-(4'-phenoxy-benzyl)-para-amino-guiacol. | N-(4'-phenoxy-benzal)-para-amino-guiacol. |
| N-(alpha-naphthyl-methyl)-para-aminophenol. | N-(alpha-naphthal)-para-aminophenol. |
| N-(4'-phenyl-benzyl)-para-aminophenol. | N-(4'-xenal)-ortho-aminophenol. |
| N-benzyl-1-amino-7-naphthol. | 1-benzal-amino-7-naphthol. |
| N-benzyl-4-amino-1-hydroxy-anthracene. | 4-benzal-amino-1-hydroxy-anthracene. |
| 2:4-dibenzyl-aminophenol. | 2:4-dibenzal-aminophenol. |
| 2:4:6-tri-(4'-methyl-benzyl-amino)-phenol. | 2:4:6-tri-(para-tolual-amino)-phenol. |

Likewise, the invention is applicable to the production of compounds having the following general formula:

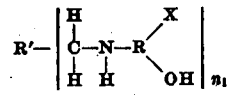

from compounds having the following formula:

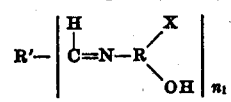

in which R, R' and X have the foregoing signification, and $n_1$ is an integer more than one. An example of a product falling within this general formula is para'-xylylene-bis-para-aminophenol prepared from terephthalal-para-aminophenol.

The method of procedure in effecting the hydrogeneration is subject to variation but preferably involves dissolving and/or suspending the raw material in the solvent in the presence of an active hydrogenating catalyst, and subjecting this mixture to the action of hydrogen under pressure and at elevated temperatures.

The choice of the solvent has a decided effect upon the results obtained. As an illustration, N-benzyl-para-aminophenol may be obtained in 95% yield by the reaction of hydrogen with N-benzal-para-aminophenol according to the method described in the examples in which aromatic hydrocarbons such as benzene and toluene are used as solvents, whereas the yield is of the order of 50% when the reaction is carried out in the presence of ethyl alcohol. The non-hydrogenated solvents such as benzene and toluene also possess certain distinct advantages over hydrogenated solvents such as, for example, decahydronaphthalene, hexahydrobenzene and the like. Thus, the non-hydrogenated solvents are, in general, better solvents for both the benzal and the benzyl compounds and the operation can be effected under more concentrated conditions, giving a larger amount of product per unit of capacity. The non-hydrogenated solvents are also advantageous from the economic standpoint. Examples of other non-hydrogenated solvents which may be mentioned are the xylenes and naphthalene.

The nature and quantity of the catalyst used is subject to variation. In general, the more active the catalyst and the higher the pressure used, the smaller the quantity of catalyst required to effect reduction in a given period of time. The catalyst may be carried on a support such as, for example, kieselguhr, carborundum and the like. It may be distributed throughout the reaction mixture or fixed on a carrier in such a way that its position is more or less permanent. An active nickel catalyst, for example, active nickel supported on kieselguhr, is preferably employed but other catalysts, especially of the iron group such as active iron or cobalt, may be used. If desired, the catalyst may be in the form of a metallic wool or screen. The catalyst may also consist of a salt of a hydrogenating metal such as, for example, cobalt, copper, iron, silver or nickel, together with a promoting oxide. Such a catalyst is copper chromite which may be used in place of nickel, either with or without previous reduction.

The temperatures and pressures of operation are subject to variation but, in general, it is preferable to employ a temperature of at least 90° C. and preferably not more than 140 C., and a pressure of at least 10 atmospheres and preferably not more than about 100 atmospheres. Under these conditions the solvent, such as benzene or toluene, is not substantially hydrogenated and may be separated from the product and continuously reused in the process with no substantial loss of efficiency. By employing rather strenuous conditions of pressure (that is, at least 10 atmospheres) it is possible to carry out the process on a commercial scale with starting materials which contain small amounts of impurities such as, for example, iron, iron oxide, lead, lead oxide, aluminum salts, particularly in the form of the hydroxides and sulfates, sulfur in the form of sulfates, and small amounts of halogen compounds. This is of particular advantage because starting materials of the character described are now obtainable by a commercially practicable method, as outlined in U. S. Patent No. 2,027,902 granted to M. A. Dahlen.

The method of isolating the product from the hydrogenation mass is usually varied in accordance with its physical and chemical properties. Where the catalyst is present in the reaction mass, it may be separated in any suitable manner, for example, by filtration. The desired product may then be recovered from the filtrate by crystallization or in some other suitable way, such as distillation of the solvent followed by recrystallization from another or the same solvent.

The products of the invention find many uses, among which may be mentioned the addition to gasoline to prevent gum formation and oxidation, the addition to rubber to prevent oxidation, and the addition to fats, oils, waxes and similar substances to increase their stability. Many of the products may be used as intermediates for the production of dyes. Certain of the products also find application in the production of pharmaceuticals.

The process of the invention is especially valuable for the production of N-aralkyl-aminophenols. By the application of the process, products of the character described may be obtained in high yields and in a high state of purity. The procedures involved are relatively simple and, therefore, possess many advantages for large scale operations. The process is particularly advantageous for the production of certain substances which, according to prior art methods, have been prepared only with the greatest difficulty and in relatively low yields. Thus, the N-monoaralkyl-aminophenols may be prepared in accordance with the process of the present invention without substantial formation of by-products which contaminate the product and decrease the yields. In the production of products of this type, therefore, the invention offers many advantages as distinguished from processes in which relatively large proportions of impurities such as diaralkyl derivatives and aminophenol or other hydrolytic decomposition products are formed. Other advantages have been given above.

The compounds subjected to hydrogenation in accordance with the present invention may be termed "Schiff's bases of aromatic aminophenols in which the aromatic nuclei are devoid of reducible substituents".

As many apparently widely different embodiments of this invention may be made without departing from the spirit and scope thereof, it is to be understood that we do not limit ourselves to the specific embodiments thereof except as defined in the following claims.

We claim:

1. In a process of producing N-aralkyl-aminophenols, the step which comprises subjecting an N-aralkylidene-aminophenol to catalytic hydrogenation in the presence of a base metal catalyst in a liquid aromatic hydrocarbon under super-atmospheric temperature and pressure conditions insufficiently high to materially hydrogenate the liquid aromatic hydrocarbon.

2. In a process of producing N-aralkyl-aminophenols, the step which comprises subjecting an N-aralkylidene-aminophenol to catalytic hydrogenation in the presence of a base metal catalyst and a liquid aromatic hydrocarbon at a temperature within the range of about 90° C. to about 140° C. and a pressure of at least 10 atmospheres but insufficiently high to materially hydrogenate the liquid aromatic hydrocarbon.

3. In a process of producing N-benzyl-para-aminophenol, the step which comprises subjecting N-benzal-para-aminophenol to catalytic hydrogenation in the presence of a base metal catalyst in a liquid aromatic hydrocarbon at a temperature within the range of about 90° C. to about 140° C. and a pressure within the range of about 10 to about 100 atmospheres.

4. In a process of producing N-benzyl-para-aminophenol, the step which comprises subjecting N-benzal-para-aminophenol to catalytic hydrogenation in the presence of a base metal catalyst in a liquid aromatic hydrocarbon of the benzene series at a temperature within the range of about 90° C. to about 140° C. and at a pressure within the range of about 10 to about 100 atmospheres.

5. The process of claim 4 in which benzene is used as a solvent medium.

6. The process of claim 4 in which toluene is used as a solvent medium.

7. The process of producing N-benzyl-para-aminophenol which comprises reacting N-benzal-para-aminophenol with hydrogen in the presence of an active nickel-on-kieselguhr catalyst and benzene, while maintaining a temperature of about 100° C. and a pressure of about 400 pounds per square inch.

8. The process which comprises subjecting Schiff's bases of aromatic aminophenols in which the aromatic nuclei are devoid of reducible substituents to catalytic hydrogenation in the presence of a base metal catalyst in liquid phase in a liquid aromatic hydrocarbon under superatmospheric temperature and pressure conditions insufficiently high to materially hydrogenate said liquid aromatic hydrocarbon.

9. The process of claim 8 in which the liquid aromatic hydrocarbon is a hydrocarbon of the benzene series.

10. The process of producing N-benzyl-para-aminophenol which comprises subjecting N-benzal-para-aminophenol to catalytic hydrogenation in the presence of a base metal catalyst in a liquid aromatic hydrocarbon solvent for N-benzyl-para-aminophenol under superatmospheric temperature and pressure conditions insufficiently high to hydrogenate said liquid aromatic hydrocarbon.

MILES A. DAHLEN.
RICHARD G. CLARKSON.
MARTIN E. P. FRIEDRICH.